United States Patent [19]

Schoenherr et al.

[11] 4,092,801
[45] June 6, 1978

[54] FRESH FLOWER SUPPORT

[75] Inventors: Leonard H. Schoenherr; William J. Drablowski, both of Ludington, Mich.

[73] Assignee: Leonard H. Schoenherr, Ludington, Mich.

[21] Appl. No.: 778,231

[22] Filed: Mar. 16, 1977

[51] Int. Cl.² ............................................. A47G 7/00
[52] U.S. Cl. .................................................. 47/41.12
[58] Field of Search ................ 47/41, 41.11–41.13; 248/27.8

[56] References Cited

U.S. PATENT DOCUMENTS

| 284,745 | 9/1883 | Le Moult | 47/41.12 |
| 2,815,606 | 12/1957 | Quackenbush | 47/41.12 |
| 3,336,697 | 8/1967 | Davis | 47/41.12 |
| 3,812,617 | 5/1974 | Brody | 47/41 |
| 3,867,789 | 2/1975 | Jacobson | 47/41.12 |

FOREIGN PATENT DOCUMENTS

| 2,315,245 | 1/1977 | France | 47/41.12 |
| 1,400,409 | 7/1975 | United Kingdom | 47/41.12 |

Primary Examiner—Robert E. Bagwill
Attorney, Agent, or Firm—Price, Heneveld, Huizenga & Cooper

[57] ABSTRACT

A holder for fresh flowers comprising a water retaining foam supported in a wire frame which gives good structural support for the wet foam yet provides easy access to said foam when placing flower stems therein.

1 Claim, 11 Drawing Figures

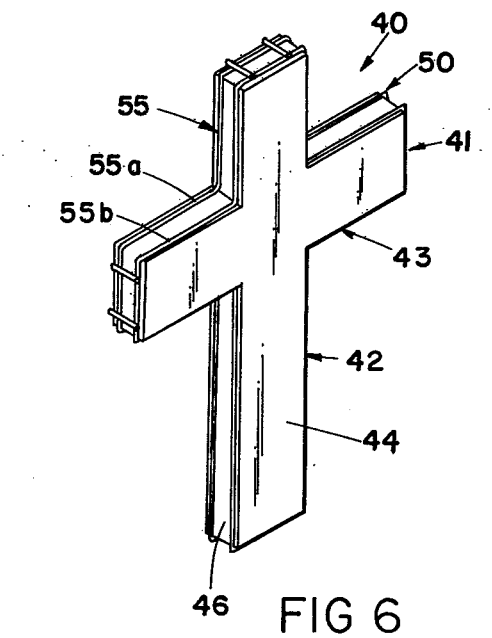
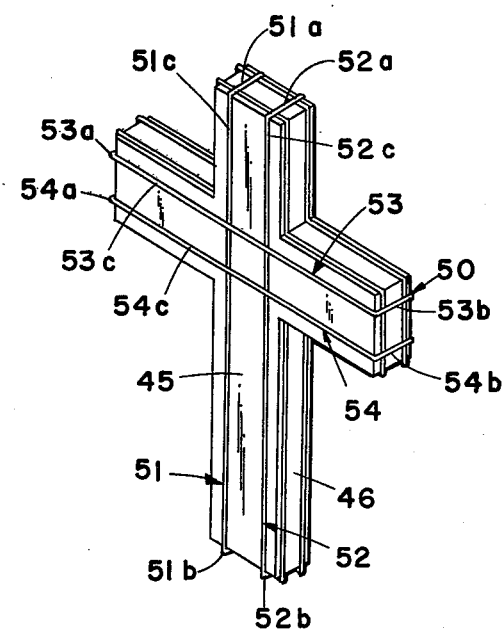
FIG 6
FIG 7
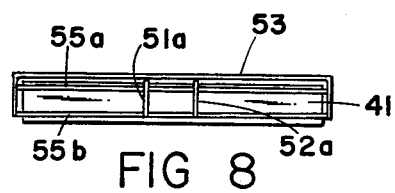
FIG 8
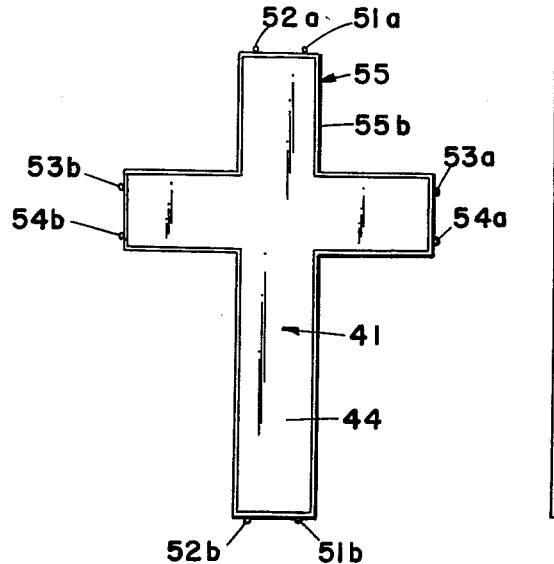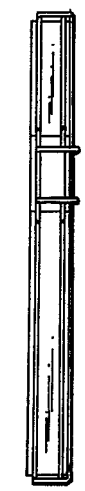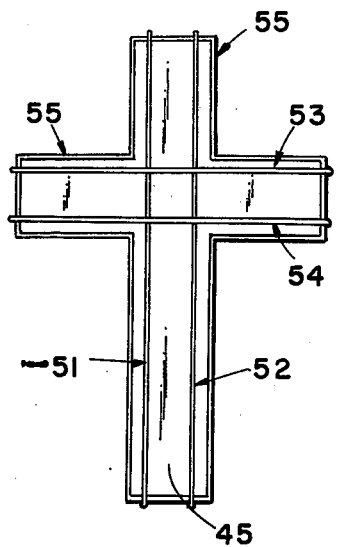
FIG 9       FIG 10       FIG 11

FRESH FLOWER SUPPORT

BACKGROUND OF THE INVENTION

1. Field of the Invention

This invention relates to ornamental wreaths and, in particular, to wreaths using fresh flowers or the like.

2. Prior Art

Prior art holders for wreaths include such flower support means as wound straw, chicken wire and styrofoam. None of these wreath support means provide a water supply for live flowers or foliage incorporated in the wreath. Without such a water supply, a wreath using live flowers cannot be made a significant time before the wreath is to be used. Thus, a florist cannot very easily spread out a particularly heavy work load. Further, the lack of water severely limits the useful display life of a wreath.

Attempts at providing a water supply for fresh flowers in wreaths include providing an individual water container for each flower and inserting the water container into the wreath. Not only must each water container be individually inserted, the container must be filled with water and then each flower must be individually inserted into the container and the open end of the container sealed as by taping. Such steps add significantly to the total cost of a finished wreath. Thus prior to this invention, the problem of providing a water supply for a wreath of living flowers has not been effectively solved. The prior art also includes the use of moss within the wreath to act as a water supply. Typically, an enclosure is required to support numerous pieces of moss and means must be provided for inserting the moss within the enclosure. Moss has a relatively low total water holding capacity and because of its proportionally large area of surface exposure is subject to a high rate of evaporation. Further, air spaces between the moss tend to reduce the effective water contact with the flower stem. These are among the deficiencies of existing wreaths for live flowers this invention overcomes.

SUMMARY OF THE INVENTION

This invention provides a holder for fresh flowers including a water retaining foam for receiving the fresh flowers and a structural frame for providing structural support for the foam. Although the foam is self-supporting when dry, the frame is necessary to support and maintain geometric integrity when the weight of the flowers and water is added. Also, the wreaths are frequently suspended or semi-suspended in which case the frame is necessary to provide an engageable means of support. In accordance with an embodiment of this invention, the water retaining foam is nested within a wire frame which has an open side for receiving the foam. The foam is press fit within the frame to provide good support for the foam and secure the foam within the frame.

Such a holder for fresh flower wreaths is particularly desirable because it provides a relatively simple, inexpensive and functionally effective means for providing water for each flower included in the wreath. Thus, the cost of providing water for each living flower is significantly reduced and the total cost of the wreath is reduced. Further, obviating the need for individual water containers for each flower eliminates a time consuming step in fabricating a wreath which requires significant skill on the part of the operator. This also reduces cost.

BRIEF DESCRIPTION OF THE DRAWINGS

FIG. 6 is a front, perspective view of a fresh flower holder in accordance with an embodiment of this invention having a cross shape;

FIG. 7 is a rear perspective view of the embodiment of FIG. 6;

FIG. 8 is a top plan view of the embodiment of FIG. 6;

FIG. 9 is a front elevation view of the embodiment of FIG. 6;

FIG. 10 is a side elevation view of the embodiment of FIG. 6; and

FIG. 11 is a rear elevation view of the embodiment of FIG. 6.

DETAILED DESCRIPTION OF THE PREFERRED EMBODIMENT

Figure 1:
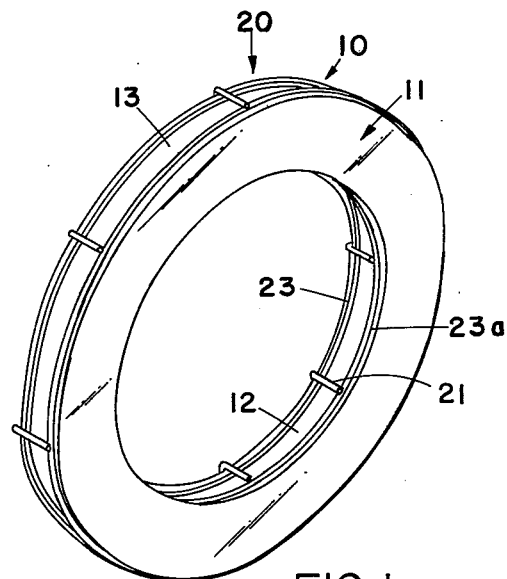
FIG. 1 is a front, perspective view of a fresh flower holder in accordance with an embodiment of this invention having a ring-like configuration.
Figure 2:
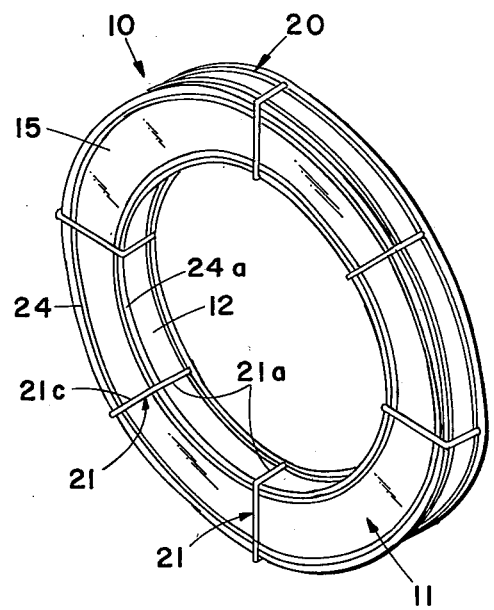
FIG. 2 is a rear perspective view of the embodiment of FIG. 1.
Figure 3:
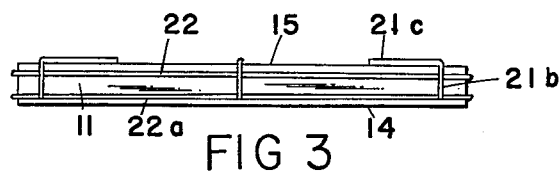
FIG. 3 is a side elevation view of the embodiment of FIG. 1.
Figure 4:
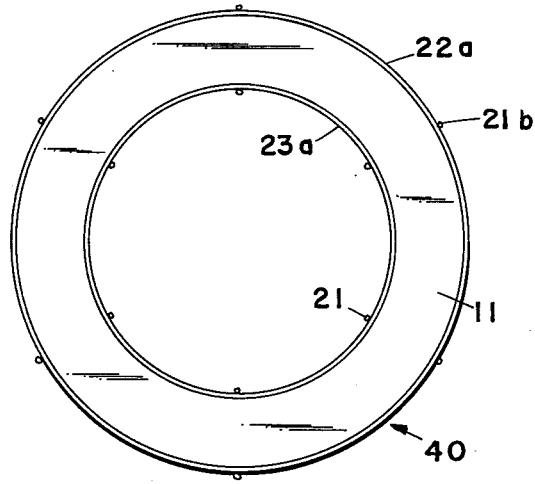
FIG. 4 is a front elevation view of the embodiment of FIG. 1.
Figure 5:
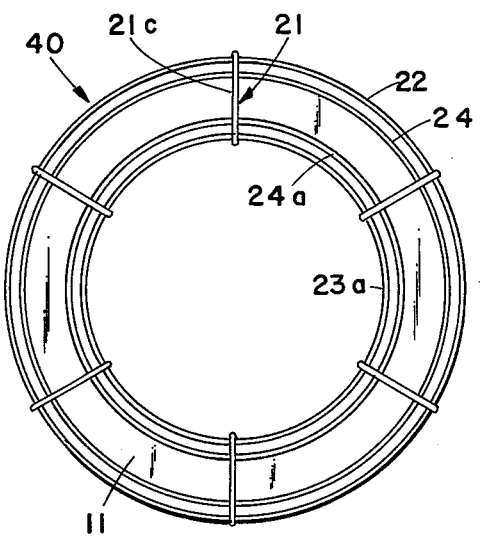
FIG. 5 is a back elevation view of the embodiment of FIG. 1.

Referring to FIGS. 1–5, a ring 10 provides a holder for live flowers forming a wreath and includes an annular foam body or member 11 having the shape of a cylinder with a longitudinal, central cylindrical opening. Foam member 11 has a cylindrically-shaped inner wall 12 and a cylindrically-shaped outer wall 13 centered about the same axis of symmetry with outer wall 13 having a larger diameter than inner wall 12. The planar, annular ends of foam member 11 are formed by a front disc surface 14 and aback disc surface 15, each surface 14 and 15 extending between walls 12 and 13. A frame 20 around foam member 11 extends along inner wall 12, outer wall 13 and back disc surface 15. Accordingly, frame 20 is sized to form a nest or pocket into which foam 11 is press fit and does not extend across front disc surface 14 of foam 11.

Frame 20 includes a plurality of U-shaped brackets 21 positioned to be aligned with the radius of ring 10 at circumferentially spaced locations around ring 10. A bottom portion 21c of U-shaped bracket 21 extends along back disc surface 15, a first side leg 21a of bracket 21 extends along inner wall 12 and a second side leg 21b of U-shaped bracket 21 extends along outer wall 13. A pair of circular frame members 22 and 22a are axially spaced and extend around the circumference of ring 10 over outer wall 13. Where leg 21b of each bracket 21 intersects circular frame member 22 and 22a, the bracket and frame members are rigidly joined as by welding. Analogously, an inner circular frame member 23 and a longitudinally spaced inner circular frame member 23a extend along inner wall 12 and are rigidly connected to leg 21a of bracket 21 as by welding. A pair of back circular frame members 24 and 24a extend along back disc surface 15 and crossportion 21c of the brackets 21. Frame member 24a has a smaller diameter than frame member 24 and is positioned closer to inner wall 12 than is frame member 24. Intersections of frame members 23, 23a, 24 and 24a with brackets 21 are rigidly connected. Referring to FIGS. 6–11, a cross 40 provides a modified embodiment of this invention for supporting a cross-shaped wreath of live flowers. Cross 40 includes a cross-shaped foam body 41 having a vertical arm 42 and a horizontal arm 43. Foam body 41 has a major cross-shaped planar front surface 44 and a major cross-shaped planar back surface 45. A peripheral side surface 46 extends perpendicularly between the edges of surfaces 44 and 45 and forms the outline of the cross. A frame 50 is generally cross-shaped and extends along peripheral side surface 46 and across back surface 45. Accordingly, frame 50 is sized to form a nest into which foam 41 is press fit and does not cross front surface 44 of foam 41.

In particular, frame 50 includes a pair of spaced, parallel U-shaped brackets 51 and 52 having web or rear portions 51c and 52c, respectively, (FIG.7), extending longitudinally and parallel along back surface 45 of vertical arm 42. Legs 51a, 51b, 52a and 52b extend perpendicularly from the extremities of portions 51c and 52c, respectively, along peripheral side surface 46 at the top and bottom ends of vertical arm 42. Frame 50 further includes a pair of spaced, parallel U-shaped brackets 53 and 54 having rear central web portions 53c and 54c, respectively, (FIG. 7), longitudinally extending along rear surface 45 of horizontal arm 43. Legs 54a, 54b and 53a, 53b extend perpendicularly from the extremities of central portion 54c and 53c, respectively, along peripheral side surface 46 at the left and right ends of horizontal arm 43. Brackets 51-54 intersect at four points adjacent back surface 45 and are rigidly connected at those points by suitable means such as welding. A side frame 55 includes a pair of spaced parallel members 55a and 55b extending parallel to front surface 44 and along peripheral side surface 46. Accordingly, members 55a and 55b define the shape of a cross. The intersections of side frame 55 with the end leg portions of the brackets 51-54 are also rigidly connected as by welding.

The fabrication of a ring 10 or a cross 40 in accordance with an embodiment of this invention includes forming a body of a rigid water retaining foam of the desired shape. For example, a typical material for the foam is phenol formaldehyde resin. One example of such a foam is a phenol formaldehyde resin such as that sold by Reichold Chemicals, Inc. under the trademark PHYOPHEN, manufacturer's code identification 93-392. An example of another resin type which can be used is an open-cell styrene. It is necessary that the foam be open-celled so that it is permeable to water. This type of foam has a desirably high water retaining ability but, typically, requires additional support when loaded with water and supporting flowers. The stems of the flowers can be forced to penetrate it without destroying its basic integrity. This assures contact with the water and positive support for the flowers. The frame can typically consist of steel wires which are bent and welded together to form the desired shape. The size of the frame in relation to the size of the foam is such that the foam fits snugly within the frame and there is enough friction so that foam cannot fall out of the frame. The frame must firmly and tightly encompass the foam on all surfaces except the front to assure positive support. This is particularly true of the large wreaths because of the weight of the substantial quantities of water involved. Despite the necessity for openness the frame must be rigid and maintain its geometric integrity when the wreath is fully waded. It must also be capable of being subject to a reasonable degree of handling while fully loaded.

When using the wreath holder in accordance with an embodiment of this invention, the foam is cut or formed to a shape and size to snugly fit into the frame. It is then press fit into the frame. After the frame and foam have been assembled, the foam-frame combination body is soaked in water long enough to saturate the foam and the excess is allowed to drip off. It is, of course, possible to arrange the flowers in the holder before the water soaking.

Various other modifications or variations will no doubt occur to those skilled in the art to which this invention pertains. For example, the particular shape of the foam may be varied from that disclosed herein. Further, the frame may include members for hanging or otherwise supporting the holder. However, it is important that these modifications maintain as open a frame structure as possible to avoid interference with the arrangement of the flowers. These and all other variations which basically rely on the teaching by which this disclosure has advanced the art are properly considered within the scope of this invention as defined by the appended claims.

The embodiments of the invention in which an exclusive property or privilege is claimed are defined as follows.

1. A holder for fresh flowers comprising a frame and a body of rigid, open-cell water permeable foam, said body being shaped to form the structural support and shape definition for a wreath, said body being of substantial thickness and having a generally rectangular cross section with front and rear surfaces and having a length substantially greater than either its width or depth; said frame having spaced first wire elements seated around and against the side faces of said body and spaced second wire elements seated against the rear face of said body and generally U-shaped third wire elements having end leg portions joined by web portions, said web portions extending across said rear surface of said body and said end leg portions extending in a rear to front direction across the side faces of said body, said first and third elements intersecting at a plurality of locations and at each intersection being welded together and said second and third elements intersecting at a plurality of locations and being welded together to form a rigid, structural frame of generally channel-like cross section and having an unobstructed front and being substantially open and unobstructed along its side faces between said first and second elements and capable of maintaining its geometric shape and integrity when supporting the foam body saturated with water and loaded with flowers; said frame forming an elongated, recessed pocket of a shape corresponding to that of the foam body and of a size to snugly receive and positively engage and clamp about said foam body and hold it against displacement or geometric reshaping resulting from extended periods of operation under fully loaded conditions with its front face in inclined to vertical position.

* * * * *